(12) United States Patent
Loofbourrow et al.

(10) Patent No.: US 7,174,290 B2
(45) Date of Patent: Feb. 6, 2007

(54) MULTI-LANGUAGE DOCUMENT SEARCH AND RETRIEVAL SYSTEM

(75) Inventors: Wayne Loofbourrow, Sunnyvale, CA (US); David Cásseres, Palo Alto, CA (US)

(73) Assignee: Apple Computer, Inc., Cupertino, CA (US)

( * ) Notice: Subject to any disclaimer, the term of this patent is extended or adjusted under 35 U.S.C. 154(b) by 610 days.

(21) Appl. No.: 10/612,936

(22) Filed: Jul. 7, 2003

(65) Prior Publication Data

US 2004/0006456 A1 Jan. 8, 2004

Related U.S. Application Data

(63) Continuation of application No. 10/080,513, filed on Feb. 25, 2002, now Pat. No. 6,654,717, which is a continuation of application No. 09/200,929, filed on Nov. 30, 1998, now Pat. No. 6,466,901.

(51) Int. Cl.
G06F 17/27 (2006.01)
G06F 17/30 (2006.01)

(52) U.S. Cl. .......................................... 704/9; 715/536
(58) Field of Classification Search .................... None
See application file for complete search history.

(56) References Cited

U.S. PATENT DOCUMENTS

| | | |
|---|---|---|
| 5,276,616 A | 1/1994 | Kuga et al. |
| 5,301,109 A | 4/1994 | Landauer et al. |
| 5,369,577 A | 11/1994 | Kadashevich et al. |
| 5,475,587 A | 12/1995 | Anick et al. |
| 5,594,641 A | 1/1997 | Kaplan et al. |
| 5,983,171 A | 11/1999 | Yokoyama et al. |
| 6,006,221 A | 12/1999 | Liddy et al. |
| 6,038,527 A | 3/2000 | Renz |
| 6,101,492 A | 8/2000 | Jacquemin et al. |

OTHER PUBLICATIONS

Wechsler, Martin, et al, "*Multi-Language Text Indexing for Internet Retrieval*", Swiss Federal Institute of Technology, 1997, 16 pps.

*Primary Examiner*—Susan McFadden
(74) *Attorney, Agent, or Firm*—Buchanan Ingersoll & Rooney, PC

(57) ABSTRACT

A multi-lingual indexing and search system performs tokenization and stemming in a manner which is independent of whether index entries and search terms appear as words in a dictionary. During the tokenization phase of the process, a string of text is separated into individual word tokens, and predetermined types of tokens are eliminated from further processing. The stemming phase of the process reduces words to grammatical stems by removing known word-endings associated with the various languages to be supported. Known word endings are removed from the word tokens without any effort to guarantee that the remaining stem is contained in a dictionary. In a preferred implementation, the stemming process is only applied to nouns.

24 Claims, 3 Drawing Sheets

MULTI-LANGUAGE DOCUMENT SEARCH AND RETRIEVAL SYSTEM

This application is a continuation of application Ser. No. 10/080,513, filed on Feb. 25, 2002, now U.S. Pat. No. 6,654,717 which was a continuation of application Ser. No. 09/200,929, filed on Nov. 30, 1998, now U.S. Pat No. 6,466,901.

FIELD OF THE INVENTION

The present invention is directed to the indexing and searching of text in documents for information retrieval purposes, and more particularly to an indexing and searching system that is capable of handling text in any of a plurality of languages.

BACKGROUND OF THE INVENTION

With the increasing amount of information that is available to users via today's computer systems, efficient techniques for locating information of interest are becoming essential. To expedite the process of searching and retrieving relevant information, it is a common practice to create an index of the searchable information that is available from various sources. For instance, if a collection of documents are to be searched for information, the documents are first examined to identify terms of interest, and an index is created which associates each term with the document(s) in which it appears. Thereafter, when a user constructs a search query, the terms in that query are examined against the entries in the index, to locate the documents containing the requested terms.

Many search engines process the search results to calculate the relevance of each identified document to the query. For instance, a score can be calculated for each document, using a statistical technique that accounts for the number of query terms that are matched in the document, the frequency of each of those terms in the index, the frequency of each term in the document compared to the total number of terms in the document, and the like. Based upon these scores, the documents are displayed to the user in order of their relevance to the query. By means of such an approach, the query does not have to be a precisely constructed formula for finding only those documents which exactly match the terms of the query. Rather, it can be a list of words, or a natural language sentence.

Before a string of text from a document or other source of information can be indexed, it must be parsed into individual words. Preferably, the separated words are further processed to expedite the search and retrieval function. The process of separating a text string into individual words is known as tokenization. As a first step, the text is parsed into word tokens. A word token may or may not be a recognized word, i.e., a word which appears in a dictionary. After the word tokens have been identified, they are processed to eliminate those which do not serve as useful search terms.

A further process that can be carried out prior to indexing is known as "stemming". In essence, stemming is the reduction of words to their grammatical stems. This process serves two primary purposes. First, it helps to reduce the size of the index, since all forms of a word are reduced to a single stem, and therefore require only one entry in the index. Second, retrieval is improved, since a query which uses one form of a word will find documents containing all of the different forms.

Ideally, the stemming processing is applied to all words that take different forms, and accounts for every possible form of each word. In this type of approach, stemming is highly language dependent. In the past, therefore, information search and retrieval systems which employed stemming were designed for a specific language. In particular, the rules that were used to reduce each word to its grammatical stem would typically apply to only one language, and could not be employed in connection with other languages. Consequently, a different search and retrieval mechanism had to be provided for each different language that might be encountered in the documents to be searched.

With the widespread accessibility of various information sources that is provided by today's computing environments, particularly when coupled with worldwide telecommunications facilities, such as the internet, any given source of information might contain documents in multiple different languages. Furthermore, it is not uncommon for a single document to contain text in more than one language. In these type of environments, it would be impractical to have to identify the language of a document, and then employ a different search and retrieval system for each different language that might be encountered. It is an objective of the present invention, therefore, to provide a mechanism for indexing and searching textual content which is generic to a plurality of different languages.

SUMMARY OF THE INVENTION

In accordance with the present invention, a multi-lingual indexing and search system performs tokenization and stemming in a manner which is independent of whether index entries and search terms appear as words in a dictionary for a given language. During the tokenization phase of the process, a string of text is separated into individual word tokens. Predetermined types of tokens, known as junk tokens and stop words, are eliminated from further processing. As a further step, characters with diacritical marks are converted into corresponding unmarked lower case letters, to eliminate match errors that might result from incorrectly accented words.

The stemming phase of the process reduces words to grammatical stems by removing known word-endings associated with the various languages to be supported. To expedite the stemming process, as well as expand subsequent retrieval, the stemming process is not directed to finding the true grammatical root form of a word. Rather, a known word ending is removed without any effort to guarantee that the remaining stem actually appears in a dictionary. For instance, a vowel change that normally occurs within a word, as a result of the addition of an ending, is ignored during the stemming process.

As a further feature, the stemming process is limited to word endings that are associated with nouns. This aspect of the invention is based on the assumption that nouns are much more significant than verbs, in terms of informational content in a query. Consequently, the major processing effort is directed to nouns.

By means of these techniques, a uniform approach is provided for the tokenization and stemming of words across a variety of languages. Consequently, the search and retrieval engine can identify documents that may be relevant to the user's query, regardless of the particular language(s) appearing in a given document.

Further features of the invention, and the advantages achieved thereby, are described in detail hereinafter with reference to specific embodiments illustrated in the accompanying figures.

DETAILED DESCRIPTION

To facilitate an understanding of the present invention, it is described hereinafter with reference to a particular embodiment which is designed for the tokenization and stemming of multiple Western European languages. In addition, various parameters are described which have been found to be particularly effective in such a context. It will be appreciated, however, that the principles of the invention are not limited to this particular example. Rather, they can be employed in a variety of applications in which it is desirable to conduct searches for relevant information in text which may span a plurality of different languages.

Figure 1:
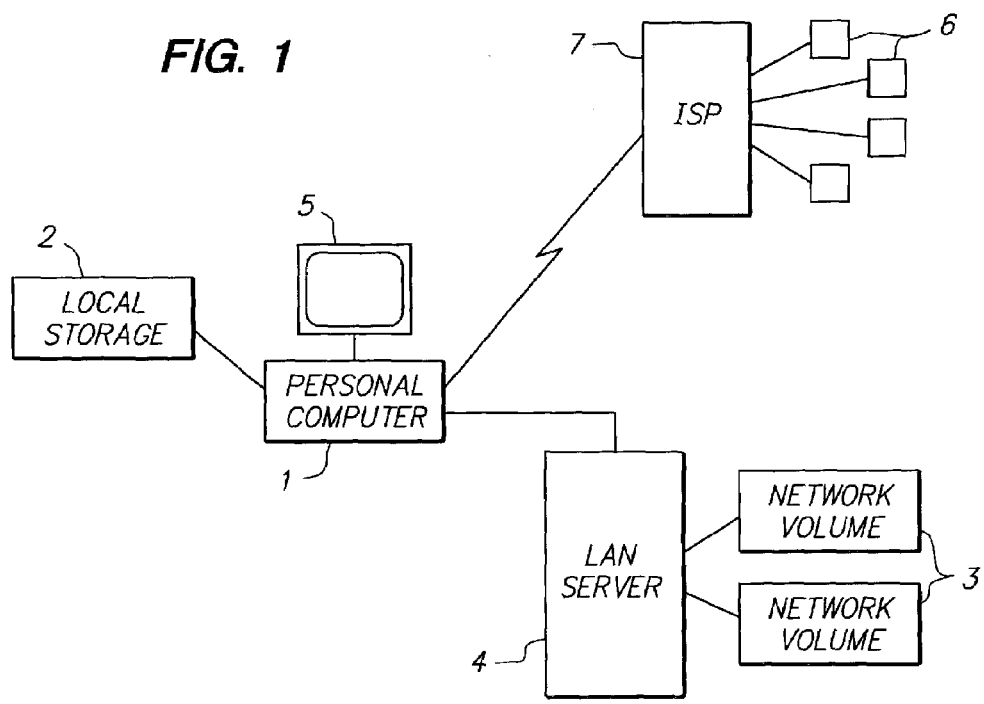
FIG. 1 is a schematic diagram of a computer system in which an information retrieval system can be employed for different purposes.

Systems for indexing and searching text can be used in a variety of different situations. For instance, with reference to FIG. 1, a personal computer 1 typically executes an operating system that may have various help files associated with it. Those help files are usually stored on local storage media 2 associated with the computer 1, such as a magnetic disk drive or an optical disk. In the case of a network computer, the help files may be stored on one or more network storage volumes 3 that are accessed via a network server 4. When the user desires assistance on same aspect of the computer's operation, he or she can enter a search query that requests information about a particular topic from the help files. In response, a search engine which may be part of the operating system examines the help files for those containing text which matches the terms in the query, and provides the results to the user via a display 5.

In another instance, the user may desire to search all of the files that are stored on the local storage media 2 and/or the network volumes 3 to find those having particular textual content. Further along these lines, the user might perform a more expansive search of various information sources 6 that are accessed via the internet, through an internet service provider 7, or some other form of wide-area telecommunication system. In this case, the search engine might be operating on the user's local computer 1, a network server 4 to which the computer 1 is connected, or one of the remote sites 6 that are accessed by the service provider 7.

Before documents and other sources of information can be searched for relevant data, they are typically processed to create an index. In the context of the present invention, the term "document" is used in a generic sense to identify any body of textual content that may be relevant to a user's query. Thus, for example, a set of documents could be a collection of electronic files in a library, or the various web pages associated with an internet site on the worldwide web.

In certain situations, not all searchable files are likely to provide relevant information. For example, as described previously, one of the applications of the present invention is in the context of a "Find by Content" feature, for locating files stored on a computer's hard disk, a network server, or the like. In this type of environment, certain types of files are not likely to yield useful information. Examples of these types of files include application programs, compressed databases, graphics, etc. Prior to conducting the indexing procedure, therefore, these types of files can be eliminated from consideration. For this purpose, the information retrieval system might employ one or more dictionaries (not shown) which define files by type, name and/or filename extension. Any file which corresponds to an entry in these dictionaries is not indexed.

Figure 2:
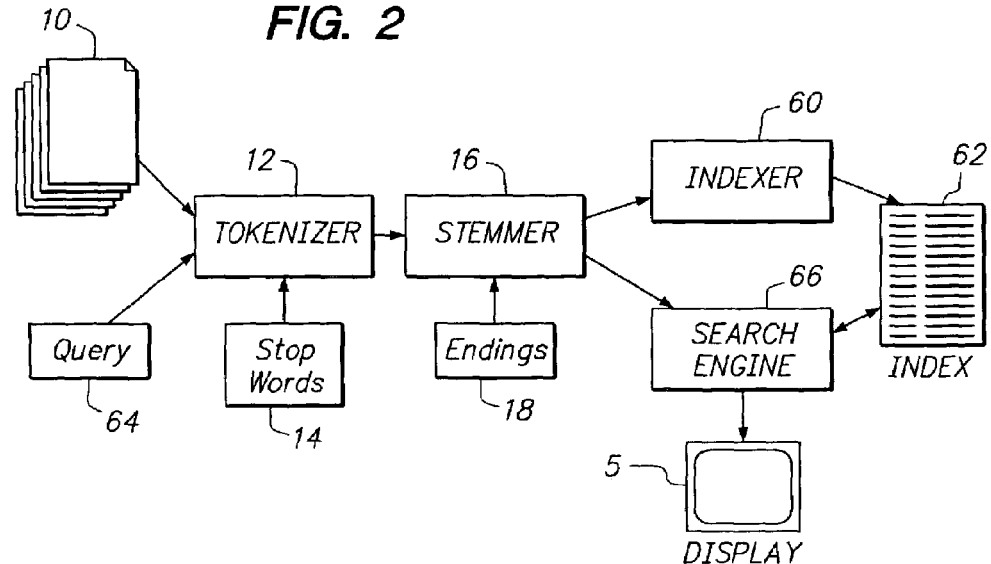
FIG. 2 is a general block diagram of an information retrieval system in which the present invention can be implemented.

An example of an information retrieval system which can be used to perform search operations, in accordance with the present invention, is illustrated in the block diagram of FIG. 2. Documents 10 from various sources which are to be searched, such as the local storage 2, network volumes 3 or internet sites 6, are first presented to a tokenizer 12. The contents which are provided to the tokenizer typically comprise more than text. Although some application programs produce pure text files, most applications generate documents comprising text that is mixed with assorted other information, e.g. formatting codes. The tokenizer 12 initially processes all of the content information that is provided to it, without attempting to distinguish between text and other information. In the context of a system which is designed to operate with Western European languages, the tokenizer first categorizes 8-bit codes as individual characters. By following a set of rules, the tokenizer groups characters into individual word tokens. One example of a set of rules that can be employed for this purpose is set forth below:

1. Control characters for horizontal tab, linefeed, vertical tab, form feed, and return characters are recognized as word separators.
2. All other control characters are treated as "junk" characters. A token containing a junk character is discarded as a junk token, as described hereinafter.
3. A comma and a period are treated as part of a number, if preceded and followed by digits; otherwise, they are recognized as word separators.
4. Other non-alphanumeric characters are treated as word separators, except for the comma and period as noted above. Characters in this category include the space character, currency symbols, punctuation, and various other symbols.
5. Capital letters are converted to lower case.
6. Certain letters are converted to other letters by stripping away diacritical marks.
7. Certain letters are converted to two-letter combinations.
8. The decimal digits 0–9 form numbers, which can also contain periods and commas. In one embodiment, digits can also appear at the beginning or end of a word. In this case, a token that contains a digit which is not at the beginning or end is discarded as a junk token.

With reference to rule 6, retrieval results are generally improved by removing diacritical marks, particularly since users may frequently omit them in their queries, or use the wrong mark. Therefore, most diacritically marked letters are converted to corresponding unmarked, lower case letters. In a similar manner, certain letters that are marked with an umlaut, and their equivalent ligatures, are converted to two-character alternate spellings. For instance, Ä and ä are converted to ae, and Ö and ö are converted to oe.

With reference to rules 2 and 8, when the entire data contents of a file are read into the tokenizer, there is no inherent indication of where actual text begins and ends. As a result, junk tokens, which do not contain any useful information for searching purposes, can result. While the presence of junk tokens in an index does not present significant problems, the index can be made smaller and the search process more efficient by detecting and removing as many junk tokens as possible. The following four rules illustrate one possible approach that can be employed for identifying and discarding junk tokens:

1. Any token that contains a junk character (control characters other than word separators) is a junk token.
2. Any token that is less than three characters is a junk token.
3. Any token that is more than 63 characters is a junk token.
4. Any token that contains both letters and digits is a junk token, if digit(s) appear anywhere except the beginning or end.

To further increase the efficiency of the search process, as well as reduce the size of the index, certain tokens which otherwise qualify as valid words are eliminated. These tokens are known as stop words, and basically constitute high-frequency words that are considered to be insignificant for purposes of finding relevant information. Typical examples of stop words include articles, prepositions and linking verbs, provided they occur commonly enough within a particular language. The stop words are listed in a stop words dictionary 14, which is referenced by the tokenizer 12. For a search and retrieval system that is designed to be used across multiple languages, one caveat should be employed in the creation of the stop words dictionary. Specifically, a word which qualifies as a stop word in one language should not be a significant word in another language. An example of this situation is the English word "the", one of the most frequently occurring articles in the language. This word is identical to the French noun "thé" (which translates to the English word "tea") after the diacritical marks are removed. In this case, "the" would not be included in the stop words dictionary 14.

The processing which takes place within the tokenizer 12 results in the generation of individual word tokens, which are presented to a stemmer 16, where each token is examined and, where appropriate, reduced to its grammatical stem. In the preferred embodiment of the present invention, multi-lingual capabilities are achieved by employing two concepts that facilitate a fast stemming operation. First, the results of the stemming only need to be approximate, rather than exact. In this aspect of the invention, the stemming is carried out by removing known word endings. These known endings are stored in a list 18. Once an ending is removed from a word token, the result becomes the stem that is employed in an index without further processing, regardless of whether that result is actually a recognized word in any of the supported languages. For example, in the English language, the plural of the word "story" is "stories". In a conventional stemming process, the plural ending "ies" is replaced with the letter "y", to provide the singular form of the word. In the context of the present invention, however, the plural ending "ies" is simply removed, and the truncated version of the word, namely "stor" becomes the stem, even though it may not be a recognized dictionary word.

As a second feature of the invention, the stemming procedure is limited to nouns. Typically, the most significant terms in a search query are nouns, and most searching is likely to be carried out on the basis of these types of words.

Accordingly, the only endings which are stored in the dictionary 18 are those which are associated with nouns in the supported languages. For a search and retrieval system that is designed to support the Western European languages, the following table illustrates one example of the word endings that might appear in the dictionary 18, together with the languages from which they originate. In the table, the endings are grouped by number of characters in each ending.

| ENDING | LANGUAGE(S) | ENDING | LANGUAGE(S) |
|---|---|---|---|
| -erne | Danish | -ies | English |
| -orna | Swedish | -les | French |
| -erna | Swedish | -nes | French |
| -arna | Swedish | -nen | German, Dutch |
|  |  | -ner | Swedish |
|  |  | -ing | Swedish |
|  |  | -ene | Danish |
|  |  | -aes | Portuguese |
|  |  | -aos | Portuguese |
|  |  | -oes | Portuguese |
|  |  | -len | German |
|  |  | -ler | German |
|  |  | -ery | English |
|  |  | -ers | German |
|  |  | -ern | German |
|  |  | -ens | German |
|  |  | -els | German |
|  |  | -eln | German |
| -es | English, French, Spanish, Portuguese | -s | English, French, Spanish, German, Portuguese |
| -er | German, Swedish, Danish | -y | English |
| -en | German, Swedish, Danish | -e | German, Italian, Swedish, Danish |
| -et | Swedish, Danish | -n | German, Dutch, Swedish |
| -or | Swedish | -o | Italian |
| -ar | Swedish | -a | Italian, Swedish |
| -el | Swedish | -i | Italian |
| -na | Swedish | -m | Portuguese |
| -le | French | -l | Portuguese |
| -ae | Portuguese | -x | French |
| -ao | Portuguese |  |  |
| -is | Portuguese |  |  |
| -ns | Portuguese |  |  |

In this example, the noun endings are all of the common inflectional endings that occur in the supported languages, such as plural endings, case endings, and the like. Other types of endings, such as suffixes or clitics, are not removed.

The removal of the endings from the words is carried out in a non-recursive manner. In other words, after an ending has been removed from a word, it is not processed further to identify other known endings. To this end, therefore, the stemming process begins with the longest endings, and then proceeds to successively shorter endings. Thus, a single-character ending is removed only if a longer ending has not been previously identified.

Figure 3A:
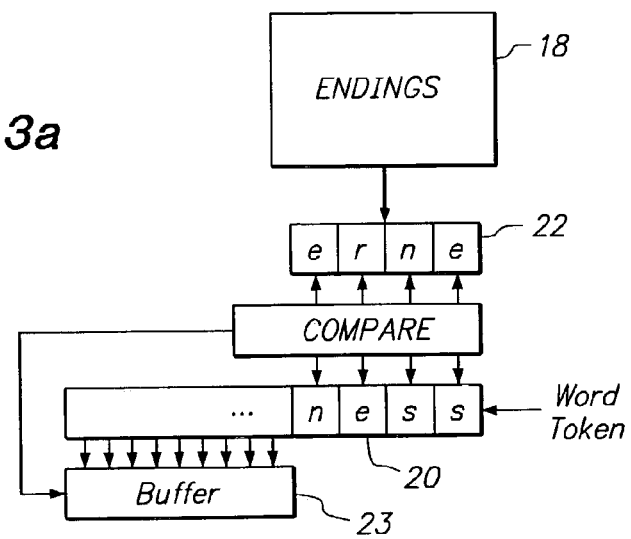
FIGS. 3a–3d illustrate one example of the examination of word tokens for known endings of successively shorter lengths.

FIGS. 3a–3d illustrate one approach that can be employed to examine the word tokens for known endings, for the situation in which the longest ending consists of four characters. Referring to FIG. 3a, the characters of the word token are serially fed into a first-in, first out register 20, until a word separator is encountered. Once this occurs, the four-character endings are sequentially loaded into another register 22, and each is compared with the last four characters in the register 20. If a match occurs, a signal is sent to store the word token, minus the last four characters, in a buffer 23.

Figure 3B:
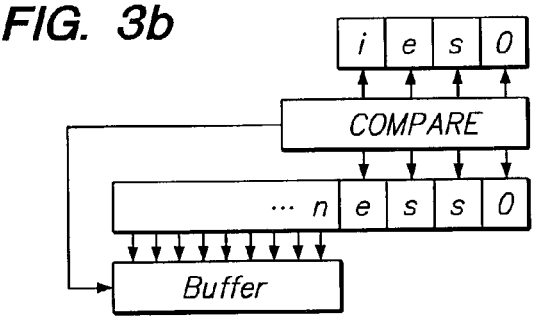

If no match occurs after the last four-character ending has been examined, a zero character is loaded into the last position of the register 20, as shown in FIG. 3b. The three-bit endings are then sequentially loaded into the register 22, for comparison testing. In this case, a zero character is also loaded into the last position of the register 22. If desired, the three-bit endings can be stored in the dictionary 18 with a zero in the fourth position, and thereby directly loaded into the register 22 in the same manner as the four-character endings. If a match occurs in this situation, the word token minus the last four characters in the register 20 is stored as the stem. Due to the presence of the zero character inserted into the last position, only the last three characters of the word token are removed to form the stem.

Figure 3C:
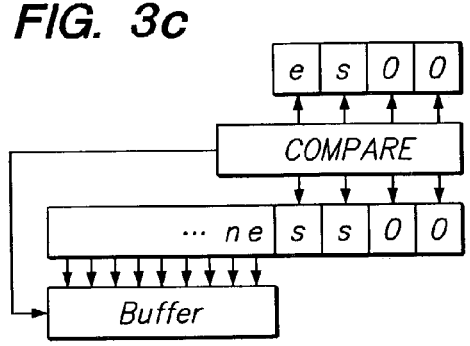
Figure 3D:
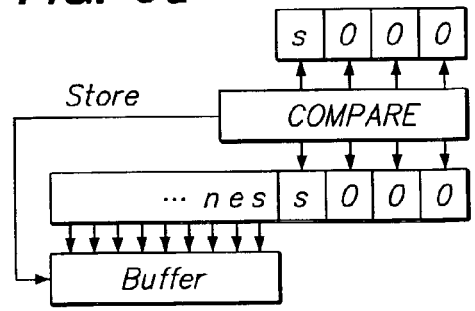

A similar procedure is carried out for two-character and single-character endings. At each step, another zero character is inserted into the last position of each of the registers 20 and 22, as illustrated in FIGS. 3c and 3d. In this particular example, the final "s" on the word token matches a known one-character ending, and is therefore removed to form the stem. If no match occurs for any of the endings, the entire word token is stored in its original form.

As a further constraint that can be employed in one embodiment of the invention, the stem which remains after an ending has been removed can be required to have a predetermined minimum length. In one embodiment of the invention, this minimum length is equal to four characters. Hence, if the removal of a long ending would result in a stem that is less than four characters in length, that ending is not removed. In such a case, however, a shorter ending might still be removed, as long as it results in a stem of at least four characters in length. For example, the tokenizer 12 may present the word token "spies" to the stemmer 16. Even though the endings "ies" and "es" are contained in the dictionary 18, neither of these endings is removed from the word token, since the resulting stem would be shorter than four characters. However, the single-character ending "s" can be removed, resulting in the stem "spie".

Figure 4:
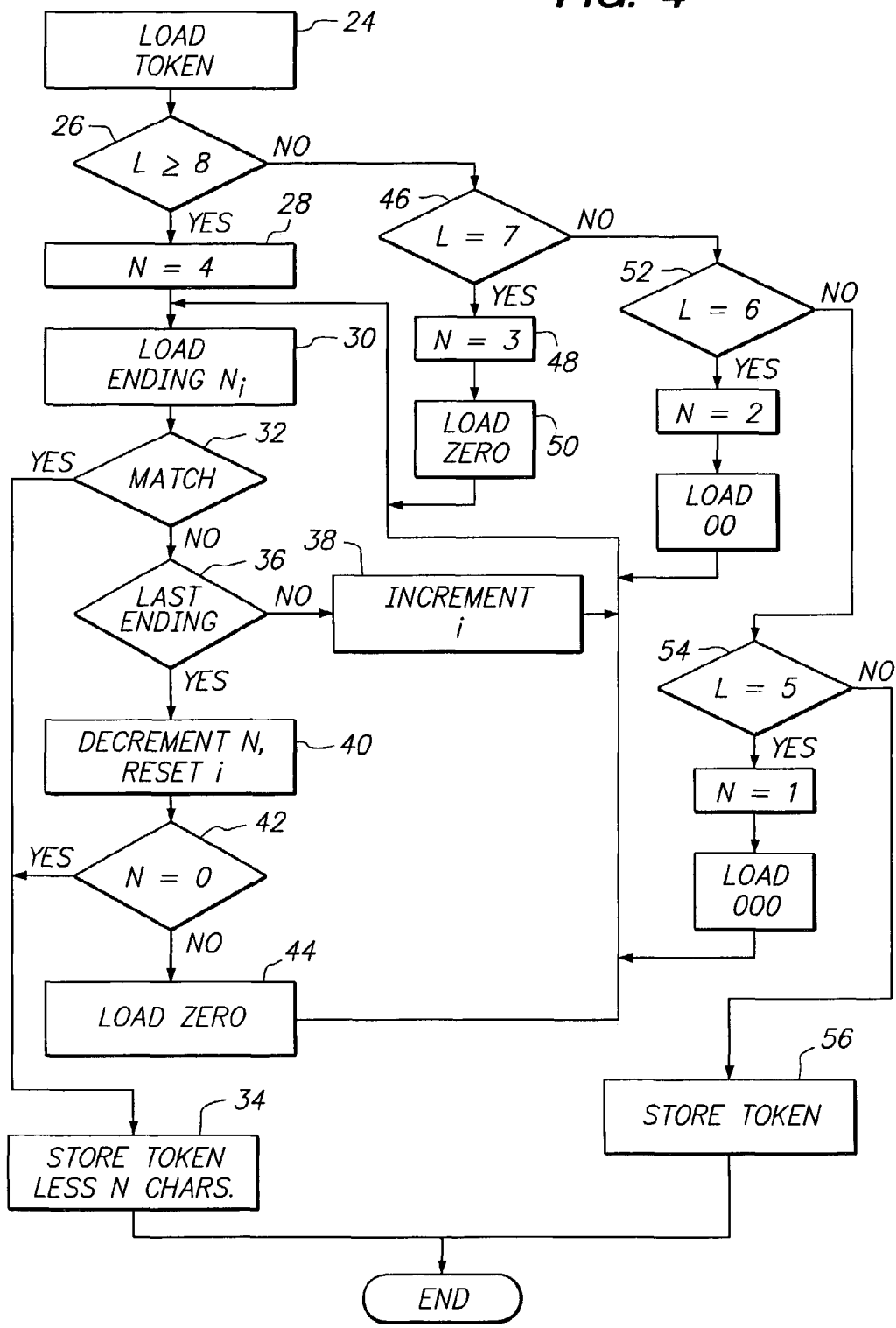
FIG. 4 is a flow chart of the stemming procedure.

A flow chart which depicts the overall stemming process is illustrated in FIG. 4. When a word token is received from the tokenizer 12, it is loaded into the FIFO register 20, at step 24. A determination is made at step 26 whether the length L of the word token is at least 8 characters. If the word token does not contain at least 8 characters, it would not be possible to remove any of the known 4-character endings, since to do so would result in a stem that is less than 4 characters long. If the word token has a length of at least 8 characters, an ending length indicator, N, is set to a value of four at step 28, and the first 4-character ending, $N_i$, is loaded into the register 22, at step 30. A comparison is then made at step 32, to determine whether the two sets of characters in the registers 20 and 22 match one another. If a match occurs, the word token, minus the last N characters, in this case the last four characters, is stored in the buffer 23, at step 34.

If no match occurred at step 32, a determination is made at step 36 whether the last known ending of length N has been evaluated. If not, an index value, i, is incremented at step 38, and the process returns to step 30. The procedure continues to loop through steps 30, 32, 36 and 38 until a match is found, or all of the endings of length N have been tested. If the last ending is reached without a match, the ending length indicator N is decremented by one, and the index i is reset, at step 40. A determination is then made at step 42 whether the indicator N is equal to zero. In the example described herein, the decremented indicator N is equal to 3, and therefore the process proceeds to step 44, where a zero character is loaded into the last position of the register 20, as illustrated in FIG. 3b.

Thereafter, the process returns to step 30, and continues to loop through steps 30, 32, 36 and 38, to compare all of the 3-character endings to the word token. If no match is found for a 3-character ending, the ending length indicator N is again decremented at step 40, and another zero is loaded into the register 20, at step 44. The 2-character and single-character endings are compared to the word token in a similar manner. If a match is found at any point, the matching ending is removed from the word token, and the remainder is stored in the buffer 23 as the stem, at step 34. If no match is found for any of the known endings, the indicator N is eventually decremented to a value of 0, which is detected at step 42. At this point, the entire word token is stored in the buffer 23, at step 34.

Returning to step 26, if the length of the word token is less than 8 characters, a determination is made at step 46 whether the length is equal to 7 characters. If so, the ending length indicator N is set to a value of three at step 48, and a zero is loaded into the register 20 at step 50. The process then proceeds to step 30, to test all of the 3-character endings, in the manner described above.

If the word token has a length less than 7 characters, additional length determinations are carried out at steps 52 and 54. If the word token has a length of 6 or 5 characters, the ending length indicator N is set to the value of 2 or 1, respectively, and the appropriate number of zero characters are loaded into the register 20. Consequently, testing is only carried out for the known endings whose lengths are appropriate for the current word token. If, at step 54, the length of the word token is determined to be less than 5 characters, the token is immediately stored in the buffer, at step 56, without any further processing.

Referring again to FIG. 2, after each word token has been reduced to a stem, as appropriate, it is passed from the buffer 23 to an indexer 60. The indexer operates in a conventional fashion to create an index 62. Basically, each word token, or stem, that is presented to the indexer 60 is compared with all of the entries in the index 62. If no matching entry is found, that word token is added to the index, along with the identification of the document in which it appeared. In addition to the document itself, the index might identify the specific location of the word token within the document. If, on the other hand, a matching entry already exists in the index, the identification of the document, and optionally the location of the word token in the document, is added to that entry in the index.

Once the index has been created, the documents which were processed can be searched for relevant content. To do so, the user constructs a query 64, containing terms that relate to the topic in which the user is interested. The text string of the query undergoes the same tokenization and stemming processes. In this case, however, the word tokens and stems are not processed by the indexer 60. Rather, they are presented to a search engine 66, which compares them against the entries in the index 62. For each document that is identified by matching entries in the index 62, a relevance score is computed, using any suitable conventional technique. The document identifications are then displayed to the user on the display 5, preferably in order of their computed relevance.

Relevance-ranked searching inherently involves a certain amount of "fuzziness", or uncertainty, in the displayed results. The degree of fuzziness is dependent upon the technique that is used to compute the relevance score. Users are typically willing to accept this uncertainty, because it provides a useful tool for identifying which ones of a number of selected documents are most likely to be relevant to the user's interest. The tokenization and stemming techniques that are provided by the present invention increase the degree of fuzziness to some extent. As a result, useful searches can be carried out across a number of different languages within a single software configuration. In particular, by using a less rigid criterion for the terms that are employed during the indexing and searching processes, to accommodate stems that may not be recognized words, the constraints imposed by search systems that are tailored to the dictionary of a single language can be avoided. The tokenization and stemming technique of the present invention is independent of any possible combination of languages that may occur in the text of interest, thereby providing the ability to support multiple, mixed languages in a single configuration. Furthermore, it avoids the need to identify the language of a document prior to indexing and searching.

When the results are displayed to the user, it is common to display the terms from the documents which match those in the query. In the context of the present invention, since the matching terms are likely to be word stems, it is desirable to reconstruct a complete word for display to the user. In one approach, the ending that is added to the matching stem can be the one that was removed from the word token in the user's query to create the stem. Therefore, a buffer is used to store the endings that are removed during the stemming of the query, for later display purposes. If two or more different word tokens in the query result in the same stem, any one of the removed endings can be arbitrarily chosen for subsequent display, e.g. the first removed ending.

As an alternative, or in addition, it is possible to store one ending with each stem that forms an entry in the index. For instance, whenever a stem is added to the index, the ending that was initially removed to create that entry is stored along with the stem, for later reconstruction of a complete word for display. This approach is particularly useful for searches in which there is no explicit user query, such as a search for documents which are similar to an example document.

While the foregoing approaches do not provide the same level of exactitude as conventional systems which display the precise words in each document that were located in a search, they offer increased efficiency and smaller index files. Since the typical user is primarily concerned with overall document content, rather than exact words, the displayed results are satisfactory in terms of meeting those needs.

It will be appreciated by those of ordinary skill in the art that the present invention can be embodied in other specific forms without departing from the spirit or essential characteristics thereof. While an exemplary embodiment of the invention has been described with reference to languages that are based upon the Roman alphabet, the principles which underlie the invention are equally applicable to languages associated with other alphabets. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A computer-readable medium containing a computer program for searching for documents that may contain text in any of a plurality of languages, wherein the computer program performs the steps of:
   separating text in each document to be searched into individual word tokens;
   reducing the word tokens to grammatical stems by removing word endings that are associated with any one or more of the languages, without regard to whether the remaining stem is a recognized word in any of the plurality of languages;
   storing the stems in an index that identifies the documents in which words containing the stems appeared;
   parsing a query containing a string of text into individual word tokens;
   reducing the word tokens from the query to grammatical stems by removing word endings that are associated with any one or more of the languages, without regard to whether the remaining stem is a recognized word in any of the plurality of languages;
   searching the index for entries that match the stems obtained from the query; and
   displaying an identification of the documents that contained matching entries.

2. The computer-readable medium of claim 1, wherein the computer program performs the step of:
   displaying a matching entry along with the identification of the document in which it appears, wherein a stem is displayed together with an ending to present a full word to the user.

3. The computer-readable medium of claim 1, wherein a stem is stored in the index together with the ending that was removed from a word token to form that stem, and an entry in the index that matches a stem from a query is displayed with the stored ending.

4. A system for searching for documents which may contain text in any of a plurality of languages, comprising:
   a tokenizer which separates text in each document to be searched into individual word tokens;
   a stemmer which reduces the word tokens to grammatical stems by removing word endings which are associated with any one or more of the languages, without regard to whether the remaining stem is a recognized word in any of the plurality of languages;
   an indexer which stores the stems in an index and which identifies the documents in which words containing the stems appeared;
   a search engine which parses a query containing a string of text into individual word tokens, reduces the word tokens from said query to grammatical stems by removing word endings which are associated with any one or more of the languages, without regard to whether the remaining stem is a recognized word in any of the plurality of languages, and searches the index for entries which match the stems obtained from said query; and
   a display which displays an identification of the documents which contained matching entries.

5. The system of claim 4 wherein the display displays a matching entry along with the identification of the document in which it appears, and wherein a stem is displayed together with an ending to present a full word to the user.

6. The system of claim 4 wherein a stem is stored in said index together with the ending that was removed from a word token to form that stem, and an entry in the index that matches a stem from a query is displayed with said stored ending.

7. A system for determining a relevance ranking for documents that may contain text in any of a plurality of languages, comprising:
   a tokenizer that parses a string of text in a received query into individual word tokens;
   a stemmer that reduces the word tokens from the query to grammatical stems by removing word endings that are associated with any one or more of the languages, without regard to whether the remaining stem is a recognized word in any of the plurality of languages;

a search engine that searches an index for entries that match the stems obtained from the query, wherein the index identifies the documents in which words containing the stems appeared, retrieves a summary for each document identified as containing matching entries, separates text in each summary into individual word tokens, reduces the word tokens from each summary to grammatical stems by removing word endings that are associated with any one or more of the languages, without regard to whether the remaining stem is a recognized word in any combination of the plurality of languages, and compares the stems obtained from the query with the stems obtained from each summary to determine the relevance ranking for each document identified as containing matching entries; and a display that displays said relevance rankings.

8. The system of claim 7, wherein said display displays an identification of the documents that contained matching entries, in order of relevance ranking.

9. The system of claim 8, wherein said display displays a matching entry along with the identification of the document in which it appears, wherein a stem is displayed together with an ending to present a full word to the user.

10. The system of claim 8, wherein a stem is stored in the index together with the ending that was removed from a word token to form that stem, and an entry in the index that matches a stem from a query is displayed with the stored ending.

11. The system of claim 7, wherein the word endings that are removed are limited to those ending that are associated with nouns.

12. The system of claim 7, wherein a word ending is not removed if the resulting stem is less than a predetermined length.

13. The system of claim 12, wherein the predetermined length is four characters.

14. The system of claim 7, wherein the stemmer performs the reducing step once per word token.

15. The system of claim 14, wherein the stemmer performs the reducing step by first examining each word token for the longest known endings, and examining the token for successively shorter endings until a known ending is identified in the word token and removed.

16. A system for determining a relevance ranking for documents that may contain text in any of a plurality of languages, comprising:

a tokenizer that parses the string of text in a received query into individual word tokens;

a stemmer that reduces the word tokens from the query to grammatical stems by removing word endings that are associated with any one or more of the languages, without regard to whether the remaining stem is a recognized word in any of the plurality of languages;

a search engine that searches an index for entries that match the stems obtained from the query, wherein the index identifies the documents in which words containing the stems appeared, separates, into individual word tokens, text in each document identified as containing matching entries, reduces the word tokens to grammatical stems by removing word endings that are associated with any one or more of the languages, without regard to whether the remaining stem is a recognized word in any of the plurality of languages, and compares the stems obtained from the query with the stems obtained from each document identified as containing matching entries to determine the relevance ranking for each identified document; and a display that displays said relevance rankings.

17. The system of claim 16, wherein said display displays an identification of the documents that contained matching entries, in order of relevance ranking.

18. The system of claim 17, wherein said display displays a matching entry along with the identification of the document in which it appears, wherein a stem is displayed together with an ending to present a full word to the user.

19. The system of claim 17, wherein a stem is stored in the index together with the ending that was removed from a word token to form that stem, and an entry in the index that matches a stem from a query is displayed with the stored ending.

20. The system of claim 16, wherein the word endings that are removed are limited to those ending that are associated with nouns.

21. The system of claim 16, wherein a word ending is not removed if the resulting stem is less than a predetermined length.

22. The system of claim 21, wherein the predetermined length is four characters.

23. The system of claim 16, wherein the stemmer performs the reducing step once per word token.

24. The system of claim 23, wherein the stemmer performs the reducing step by first examining each word token for the longest known endings, and examining the token for successively shorter endings until a known ending is identified in the word token and removed.

* * * * *